UNITED STATES PATENT OFFICE.

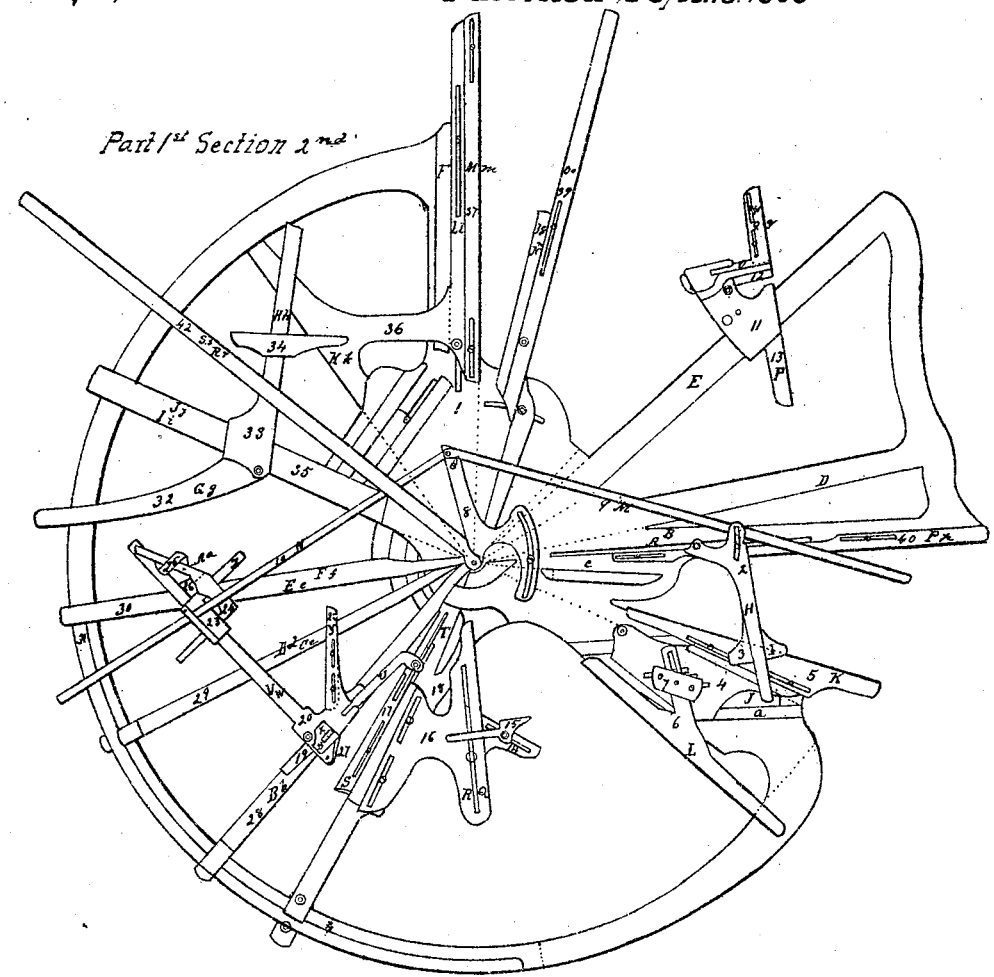

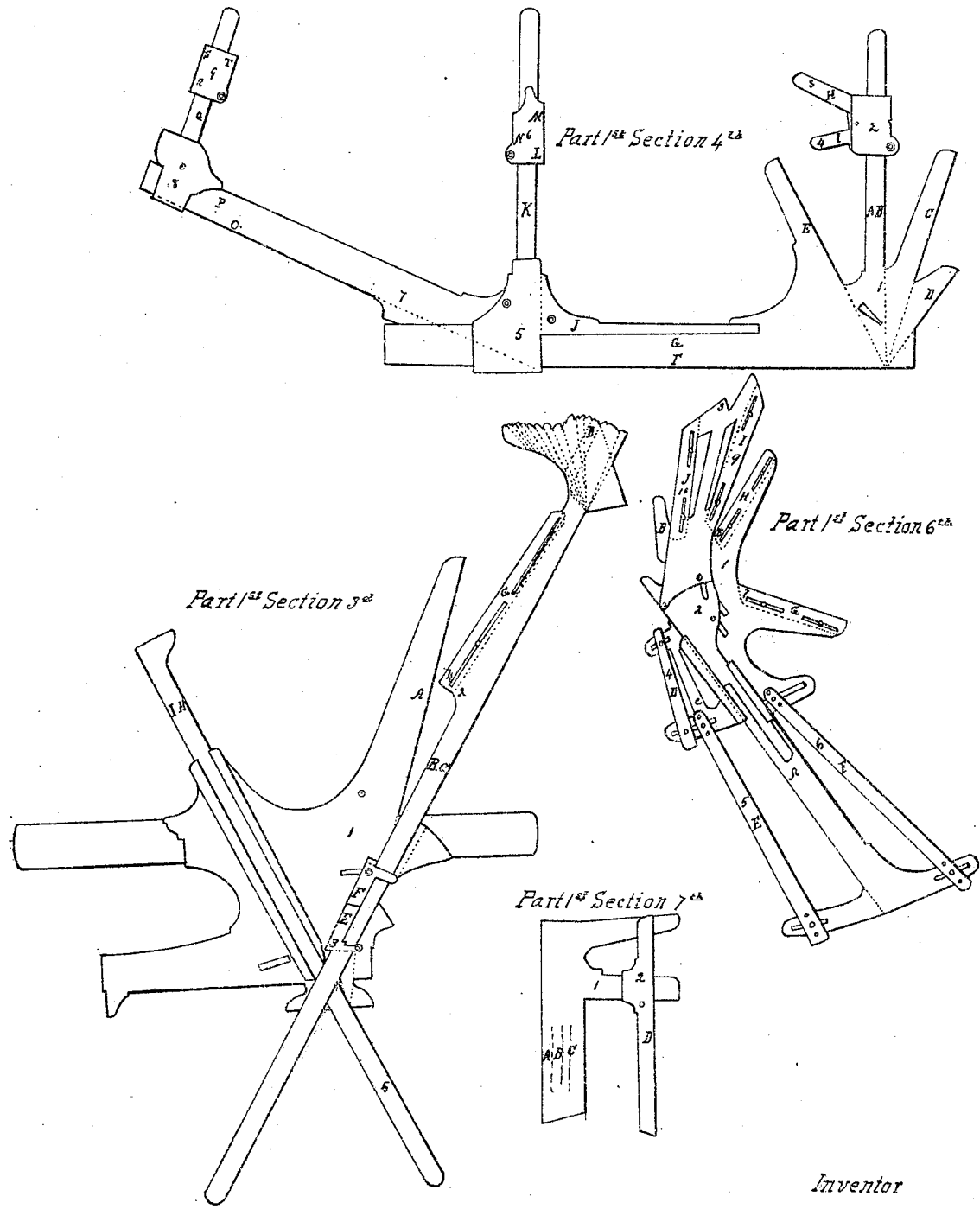

WM. W. ALLEN, OF BORDENTOWN, NEW JERSEY.

TAILOR'S MEASURE.

Specification of Letters Patent No. 7,641, dated September 10, 1850.

*To all whom it may concern:*

Be it known that I, WILLIAM W. ALLEN, of the borough of Bordentown, county of Burlington, and State of New Jersey, have discovered a new Method of Applying Measures for the Purpose of Cutting Garments and invented a machine for the purpose of drafting the several garments as performed in the tailoring business.

The machine used to carry out or apply the said newly discovered principle or method is made of brass, and its construction consists of parts with scales with a double set of numbers marked on some where necessary; one set corresponding to or with the measures taken on the body with an inch measure the other being proportions of a regular shape, all of which that are necessary are subject to any desirable change to suit any and every desirable fashion or fancy.

The machine is furnished with slides and grooves to meet the requirement of all sizes and shapes and fastened by means of stop-screws at any desirable point. Such parts as require circular motion work on pivots changing the angle to make three motions meet forming a triangular movement giving the size and shape of the part together with the convexity which attends the surface of the body, after which the separate parts so obtained are brought together by the same process by their working on a center pivot (for a coat) directly in front of the scye being brought to suit three measures passing over the whole which motion gives and sets the curves and angles of the whole part making it the shape and size of a flat surface what will fit an oval round, tapering or any other shaped body which makes it necessary to have a machine with parts which will give a direct, a lateral and a circular motion, in order that after the lengths are set, to change their angles retaining their lengths to meet other lengths on opposite seams thereby forming a pattern upon scientific principles leaving nothing for the judgment (or guesswork) of the operator.

The present drawing which accompanies and forms a part of this specification represents the machine in part, whole size, other parts half size, but could be laid whole size in all its parts, or in half fourth or eighth size in all its parts, or in any number of the parts to any size and still to adhere to the principle in the various methods or combinations.

The principle upon which the present machine is laid is when it is set to its proportionable angle, is a gradation of all the sizes of a coat or garment of one shape and by moving any one of the angles it produces another shape, and you then have an entire gradation of that shape, and so on to any one of the angles, producing different shapes but of regular proportions in each shape. The piece No. 42 called pointer on forepart is laid to double the half-size as scale R, $r$, on it is laid half inch to an inch on said S, $s$, if the parts were laid in fourth size then scale R, $r$, would be laid in fourth size and on to suit whatever it is laid to.

The several parts necessary for the coat and the particular parts of the coat are all obtained by the application of the same principle by means of the assistance of said machine, the following description by dividing into parts and numbering them and the several parts as sections of each, together with reference being had to the annexed description and drawing of the same, making part of this specification to wit: The machine is composed of one principal part and comprises seven sectional parts.

Principal part for drafting coats.

Section 1 is for drafting the backs of coats. Section 2 is for drafting the fore parts of coats. Section 3 is for drafting the skirts of coats. Section 4 is for drafting the sleeves of coats. Section 5 is for drafting the lapels of coats. Section 6 is for drafting the collars of coats. Section 7 is for drafting the cuffs of coats. Hence it is claimed that the principle is applicable to every department of the art of drafting and cutting and might be obtained to a considerable degree for some of the practical parts of cutting by means of machines of less complicated structure, or even by means of diagrams marked on paste-board or other material, but in order to illustrate the perfection, by which the principle is applicable to every ramification of shape size and peculiar fashion or fancy that may prevail, a machine like the one represented by the drawing best demonstrates.

For the purpose of describing the drawings which represent the machine comprising the several parts and sections or pieces, and also to apply the said machine with all its parts to the principle discovered in the art of drafting and cutting, the following method is adopted, to wit:

*Section 1—For drafting backs of coats.—* Piece No. 1, bed-plate with graduated scales of Nos. designated A, B; piece No. 2, for setting width of back, designated C, D, E; piece No. 3, for top of back and bottom of scye, designated F, G, H; piece No. 4, for length of waist and width of back at hollow of waist, I, J, K; piece No. 5, for length of waist as cut and width of back, L, M, N; piece No. 6, for setting Nos. 23 & 21, on section two, O; piece No. 7, for setting No. 33 on section two, P; piece No. 8 on No. 1 obtain width of back movable for fashion, Q; piece No. 9 attached to No. 1 width of back movable for fashion, R; piece No. 10 on No. 2 to obtain width and top of back-scye movable for fashion, S; piece No. 11 on No. 1 to obtain width of back movable for fashion, T; piece No. 12 on No. 3 to obtain width of back movable for fashion, U.

*Section 2—For drafting fore parts of coats.—* Piece No. 1, bed-plate with graduated scales and Nos. A, B, C, D, E, F, G; piece No. 2, for setting height of shoulder, H; piece No. 3, for keeping angle of back, I; piece No. 4, for keeping angle of shoulder, J; piece No. 5, for setting the center of shoulder, K; piece No. 6, for setting the lower shoulder point, L; piece No. 7, for change of fashion; piece No. 8, for setting position of fore-part; piece No. 9, for setting position of shoulder, M; piece No. 10, for setting position of waist, N; piece No. 11, for front and top of breast; piece No. 12, for front and top of breast, O; piece No. 13, for roll of breast, P; piece No. 14, for tops of side-seams; piece No. 15, for tops of side-seams; piece No. 16, for fashion, Q, R; piece No. 17, for fashion, S; piece No. 18, for bottom of scye, T; piece No. 19, for width of back, U; piece No. 20, for obtaining length of side-seam, V, W; piece No. 21, slide for obtaining size over blade, X; piece No. 22, for fashion, Y; piece No. 23, for obtaining width of back at waist, Z; piece No. 24, for obtaining length of side seam and setting width of back at waist, A, a; piece No. 25, to keep the point at length of setting; piece No. 26, is a loose slide attached to 23 to keep it to its place; piece No. 27, is a loose slide attached to 20; piece No. 28, is to set the size over blade, B, b; piece No. 29, to set the size between the blade and waist, C, c, D, d; piece No. 30, to set the measure to waist, E, e, F, f; piece No. 31, the sub-ring attached to fasten Nos. 18, 28, 29 & 30 together; piece No. 32, to set the center of waist, G, g; piece No. 33, to set the length in front and size of waist, H, h; piece No. 34, to keep the point of size of waist; piece No. 35, for length, center & hollow of waist, I, i, J, j; piece No. 36, is to set the size of front and center of breast scales, K, k, L, l; piece No. 37, for fashion, M, m; piece No. 38, for setting roll of breast, N, n; piece No. 39, for setting roll of breast, O, o; piece No. 40, for fashion, P, p; piece No. 41, for fashion, Q, q; piece No. 42, pointer for getting hip center of waist and bottom front of breast, R, r, S, s.

*Section 3—For drafting skirts of coats.—* Piece No. 1, bed-plate with graduated scales of No. A; piece No. 2, for setting size of waist and angle of frock and over coats, B, C, D; piece No. 3, for fashion and support No. 2, E, F; piece No. 4, for fashion, G; piece No. 5, to set the width of dress coat skirt, H, I; piece No. 6, to set the width of dress coat skirt at bottom, J, K; piece No. 7, to set the length of skirt, L, M.

*Section 4—For drafting sleeves of coats.—* Piece No. 1, bed-plate with graduated scales of Nos. A, B, C, D, E, F, G; piece No. 2, to set the front and top of sleeve; piece No. 3, to set the upper side and fashion, H; piece No. 4, to set the lower side and fashion, I; piece No. 5, to set the length of elbow with width of back off, J, K; piece No. 6, to set the width of elbow, L, M, N; piece No. 7, for length and angle of sleeve, P, O; piece No. 8, to set the length of sleeve, Q; piece No. 9, to set the width, R, S, T.

*Section 5—For drafting lapels of coats.—* Piece No. 1, bed-plate with graduated scales of numbers; piece No. 2, for length and width of lapels at top, A, B; piece No. 3, for fashion, C; piece No. 4, for fashion, D; piece No. 5, for fashion, E; piece No. 6, for fashion, F; piece No. 7, for length and width of lapels at bottom, G, H, I, J.

*Section 6—For drafting collars of coats.—* Piece No. 1, bed-plate with graduated scales of Nos. A, B, C; piece No. 2, for fashion and angle of collars; piece No. 3, for fashion and angle of collars; piece No. 4, for fashion and angle of collars, D; piece No. 5, for fashion and angle of collars, E; piece No. 6, for fashion and angle of collars, F; piece No. 7, for fashion and angle of collars, G; piece No. 8, for fashion and angle of collars, H; piece No. 9, for fashion and angle of collars, I; piece No. 10, for fashion and angle of collars, J.

*Section 7—For drafting cuffs of coats.—* Piece No. 1, bed-plate with graduated scales of Nos. A, B, C; piece No. 2, for top of cuffs, D.

*Directions for taking the measures for coats.*

First, size of waist, take the measure round the waist under the coat. Second, bottom of scye, button the coat and make a mark at the collar seam (or where it should come), from which mark measure down the back seam opposite the bottom of the arm, or the most prominent part of the shoulder blade and make a mark. Third, length of waist, continue the measure down to the most hollow part of waist and make a mark. Fourth, length of cut, note where. Fifth, length of skirt, on the bottom and note where. Sixth, to elbow, measure from center of back to elbow. Seventh, to hand, and on from thence to hand. Eighth, around elbow. Ninth, around hand. Tenth, height of shoulder, place the back of left hand against the right side of the person under his arm and press it up to find the bottom of the shoulder or arm and make a cross mark ranging with the bottom and front of shoulder, place the end of the measure with the left hand to the mark at the collar-seam and bring it round in front of the shoulder with the right hand (standing at his side or back) and measure to the cross marks at the front and bottom of shoulder. Eleventh, to waist, preserve the hold of the measure at the end on collar seam and bring the measure round with the right hand to the mark at length of waist. Twelfth, over blade, raise it to the mark on the back seam opposite to the bottom of arm. Thirteenth, first shoulder measure, and then to the end of the measure at collar seam. Fourteenth, second shoulder measure, place the end of the measure with your left hand to mark on back seam opposite the bottom of arm and bring the measure round in front of the shoulder with the right hand to the left one at the place of starting. Fifteenth, position of shoulder, place the end of the measure to the cross marks front and bottom of shoulder with left hand and measure out on breast six inches* in a direction ranging with the bottom of a short rolling breasted coat, and make a cross mark, then place the end of the measure with left hand to the mark at collar-seam and measure down to the mark 6 in. out on breast. Sixteenth, position of waist, let go the end of measure and hold it fast at the mark on breast and with the left hand bring it round to the mark at length of waist. Seventeenth, over shoulder point, place the end of measure to the mark 6 in. out on breast and pass it over the shoulder point to the mark on back-seam at bottom of scye measure.

N. B.—The measures are all to be taken tight.

* Note.—In measuring a boy go 5 inches out on breast and in setting the instrument change the pivot at the intersections of pieces 9 and 10 to the inside of small curved groove on piece No. 8.

*Table of Measures for Coats.*

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| Size of waist. | Bottom of scye. | Length of waist. | Do. cut. | Length skirt. | To elbow. | Do. hand. | Around elbow. | Do. hand. | Height shoulder. | To waist. | Over blade. | First shoulder measure. | Second shoulder measure. | Position shoulder. | Do. waist. | Over shoulder point. |
| 15 | 6 | 17 | 19 | 36 19 | 20 | 31½ 20 | 6½ | 4½ | 12 | 24 12 | 23½ 12 | 26 12 | 26 | 16 | 28 16 | 19 |
|  |  |  |  | 17 |  | 11½ |  |  |  | 12 | 11½ | 14 |  |  | 12 |  |

N. B.—The measures in this table are those used in the following description.

*Description of the manner and mode of drafting by "Allen's patent drafting machine."*

Section First. To draft the backs of coats set piece No. 2 so that the number of 1st shoulder measure (which is 26) on scale C will come opposite to the edge of piece No. 1 at the end of the groove in said piece and see what No. on scale D is opposite to it, which is 11½ to 26. Then set upper edge of piece No. 3 to 11½ on scale A and the lower end of piece No 6 to 11½ on scale B (the scales T, S, R, and Q are all to be marked by the same No. 11½ and also the scales on section 2d fore part of coat). K, L, Y and V are to be set and marked by the same numbers, which will make all those different scales be governed by the No. on scale D that comes opposite to the 1st shoulder measure on scale C and set the lower edge of piece No. 4 to No. 17 on scale F that being the first length of waist at the most hollow part of waist and the lower edge of piece No. 5 to No. 19 on the same scale F, that being the length of waist as cut. Set the lower end of piece No. 7 half way between the lower edge of piece No. 4 and lower edge of piece No. 5 (which may be seen by scale M on piece No. 5) and fasten all said pieces to their places by the screw passing through the bed plate No. 1.

*To mark the back on the cloth by said instrument.*—Place the upper edge of piece No. 3 to where you want the top of back to come and in at scale N from the edge of the cloth sufficient distance to allow for a turn in of back skirt and mark the top of back by top edge of piece No. 3 and the width at top at No. 12 on scale U (12 being the height of shoulder) and mark at scales T, S, R, and Q 11¼ (11½ on scale D being opposite 26 on scale C as before described). Mark at the notch opposite the straight edge of lower side of piece No. 2 for bottom of back scye and mark opposite the scales F and L the number of the width of back at waist as called for by fashion, those scales being graduated by regular inches, and mark by the straight edge of piece No. 3 that scale F is laid on for back seam then remove the instrument and form the back to the various points given by it. Measure down from the mark given by lower edge of piece No. 5 17 inches (that being the length of back skirt to the coat here drafted) and from the same.

*Section 2—To draft the fore-part of coat.*—Set the top edge of piece No. 2 to No. 12 on scale A and fasten it by the screw attached passing through the groove in bed-plate No. 1 (that being the height of shoulder) and set piece No. 4 so that No. 12 on scale J will come half a number on it above No. 12 on scale G (that being the amount that the height of shoulder is longer than its proportion to the first shoulder measure) which may be seen by a reference to the two scales A and B. 12 on scale A stands above 26 on B that amount. Said slide No. 4 to be carried up or down in the same way to suit the difference between the height of shoulder and first shoulder measure and fasten it by the screw attached, head of which screw moves under a part of piece No. 1 bed-plate. (When the height of shoulder and first shoulder measure comes opposite each other on scales A and B the numbers 11 and 12 on scales J and G shall stand opposite to each other.) Set piece No. 8 so that number of position of shoulder which is 16 on scale M piece No. 9 will come opposite the upper edge of piece No. 2 over the groove in bed plate No. 1, and then move piece No. 8 down a half a number on scale M (which will be 16½ on scale M) and place scale M on No. 6 on scale H upper side of piece 2 and see if No. 19 on scale M will come opposite to No. 6 on scale H (No. 6 being the measure of the bottom of scye, and No. 19 being the measure over shoulder point. If measures 19 and 6 do not come opposite to each other twist piece No. 2 until they do and fasten it at its place by the screw attached and set piece No. 8 up a half a number on scale M to position of shoulder measure (which is 16) and fasten it by the screw passing through a groove in it and attached to bed-plate No. 1. Set top edge of piece No. 11 to No. 12 on scale E (No. 12 being height of shoulder measure). Set piece No. 14 so that front edge of screw attached to fasten it will come to No. 14 on scale Q (that being the back half of first shoulder measure) and fasten it with said screw which passes through a groove in piece No. 16. Set piece No. 19 so that 11½ on scale U (which was given by scales D and C on section first back of coat as before described will come opposite to the front edge of piece No. 20 at the end of groove and set slide No. 21 so that the number on scale X will come opposite the back straight edge of piece No. 20 that is between the lower end of piece No. 6 (on section first back) on scale O, that comes opposite No. 6 on scale G (of back).

No. 6 on scale G is the bottom of scye measure (which governs the setting the slide No. 21 on fore part by the distance between the No. 11½ on scale B and No. 6 on scale G) back that is to say that the slide 21 fore-part is set out or in by the distance got by the scale O on back between the end of the piece No. 6 when set and the bottom of scye measure got by the scale G on piece No. 3 back of coat (the numbers on scale X being graduated to suit the Nos. on scale O back) and fasten slides 21 and 19 by the screw which passes through piece No. 20 set upper edge of piece No. 23 fore part to the number on scale V that the number on scale K back opposite the lower end No. 6 is which governs the setting of No. 23 piece fore part by the distance between the bottom edge of piece No. 4 and the bottom end of piece No. 6 after they are set on back the scales K on back and V on fore part being graduated to suit each other. Set piece No. 20 so that the end of slide No. 21 will come opposite 11½ on scale B, C, that being the measure over blade, and fasten piece No. 20 by the screw that works in a groove on the piece No. 18 and passes through the end of piece No. 19. Set the front edge piece No. 24 to the number on scale Z that the width of back was marked by at scale E on back. Set the piece No. 25 for top edge to come to the number on scale A, *a*, at the bottom of edge of piece No. 4 comes to on scale M of back which gives the length of side seam from the most hollow part of back to where the back is cut the same as between No. 4 and No. 5 pieces on back. Move pieces Nos. 18, 28, and 30 so as to let the lower back corner of slide No. 23 or the back edge of piece No. 20 come opposite No. 12 on scale F, *f*, that being the measure to waist. The pieces No. 18, 28, and 30 being placed in a position to suit the piece No. 20 as set are all fastened to their places by means of a screw in the lower end of piece No. 18 which screw passes through the end of said piece and screws down on to the sub-ring 31. Piece 29 is then placed so that the upper edge will come to the number on scale Y that piece No. 19 is set to (which is 11½ before described which forms a pattern of a section of fore part of coat) which section is then set by moving it on the main-ring bed-plate No. 1, so that the number on scale N piece No. 10 of position measure to waist (which is 12) will come to the back edge and lower corner of piece No. 23 said piece No. 10 passing through a part of piece No. 23 then fasten the two sections of fore-part together by means of the screw which passes through piece No. 18 on the inside of main-ring head of said screw on the under side clasps the main ring or bed-plate No. 1. Set the piece No. 33 so that the top edge will come to the number on scale F, *i*, that is opposite the lower edge of the part of bed-plate No. 1, back that passes over scales P, K, O, and G that the main screw of back is attached to that is on piece No. 7 and scale P of back (which sets No. 33 piece on fore part up or down according to the distance between the lower end of piece No. 7 on back and the lower edge part of bed-plate No. 1 when that distance is longer than the measure called to waist on fore part piece No. 30 scale F, *f*, which may be seen after the piece No. 20 is set to the measure to waist the setting of piece 33 to be governed by the measure from front of scye to waist on scale F, *f*, piece No. 20 fore part or by the length as before described got on piece No. 7 back No. 33 is to be set by whichever is the longest which piece No. 33 governs the length of fore part in front and may be varied up or down from either of those lengths to suit the change of fashion. The longest of those two distances given being the regular place to set it. The scale F, *i*, on the fore part and F, *f*, ditto and P on back being all graduated to suit each other, and the one F *f*, on fore part being also graduated to suit the measure from front of scye to waist. Set piece 35 ahead or back so as to bring No. 15 on scale G, *g*, piece 32 opposite to the lower back corner of piece 23, (15 being the size of measure around the waist) piece 32 working on a hinge which is the screw passing through the pieces 33 and 32 work the piece 32 up to obtain the position of piece 35 and move it down out of the way and fasten it and 33 to 35 as it is made to catch or bear on the three pieces. After setting 35 as described fasten it to its place by the screw passing through the part of it that is a slide and through a groove in bed-plate No. 1, set piece 34 on piece 33 to No. 15 on scale H, *h*, (which is the size of waist measure) set piece 36 so that No. 12 on scale K, *k*, will come opposite and ranging with the front edge of piece 34 (No. 12 being the height of shoulder) set piece 39 that moves on piece 38 so that the front edge of the screw will come to the same number on N, *n*, that mark *o*, on lower side of piece 36 or the notch in piece 36 that lays on bed-plate No. 1, is opposite on scale F after piece 36 is set those scales of N, *n*, and F are laid commencing at *o*, and counting regular numbers in and out the marks *o*, on pieces 39, and 36 are to lay opposite to the *o*, *o*, that the scales N, *n*, and F count from when the parts are in their proportionable places, but if the waist is larger or goes out in front to suit the shape of the person, pieces 36 and 39 will move ahead or back as the case may be after being set to suit as described, then fasten them to their places by means of the screws passing through them the one in piece 36 works in a groove in bed-plate No. 1. The one in 39 works in a groove in piece 38. The piece No. 12 that works through piece No. 11, regulated in the same way as 36 and 39. The numbers on scale O, is laid the same as on scale N, *n*, commencing at an *o*, in the center and counting regularly up and down, all three being graduated to work together. The point to count from on piece No. 11 is the top front edge, or whatever the size or front of waist has set piece 36 on scale F. Set 39 on scale N, *n*, and also piece No. 12 so that scale O, will move from the point to count from up or down the same number.

*To mark the fore-part on the cloth by said instrument.*—Place pointer piece No. 42 with the edge that scale R, *r*, is on to the top edge of piece No. 25 and front edge of scale A, *a*, and fasten it by means of a large screw in front of scye then place the instrument on the cloth with No. 12 on scale P, *p*, (which is the heighth of shoulder measure without the back on) to where the top of shoulder should come and at waist so that the same No. on scale S, *s*, on pointer that is at the intersection of top edge of piece 25 and front edge of scale A, *a*, on scale R, *r*, pointer to where you want bottom of side seam to come or place the No. on scale S that is at the end of slide No. 21 on scale B, *b*, where the fullest part of side seam will come, mark through the hole at the screw front of scye and mark the height of shoulder point by scale P, *p*, at No. 12 mark the hollow part of the neck by scale D at No. 12, mark the crease row of breast by scale P at No. 12 mark the front and top of breast by scale Q, *q*, by 12, mark the length of roll of breast by scale O, *o*, at No. 12, mark the center of front of breast by scale M, *m*, at No. 12, mark the upper front part of scye by scale C at No. 12 (all those points just given to be at all times marked by what the height of shoulder is), for a button up coat in the neck mark at the top of slide No. 11, and front edge of scale E and have scale Q, *q*, and O, *o*, and mark by the scale L, *l*, instead of M, *m*, mark by scale K at No. 11½ which is the No. opposite first shoulder measure (26) on pins No. 2 of back (as before described) that being the center of shoulder and the same at scale L for lower shoulder point, provided the angle of the back on pieces No. 2 and 3 are straight with each other on their top edges but if they vary, to every notch or number of variation on scale $f$ mark (in or out as the case may be) at the lower side of scale L to the amount of the slope of the line running from bottom to top of said piece, mark at the junction of front edges of pieces No. 14 and 15 for top of side seam, mark by scale T at No. 14 for bottom of scye which is the back half of first shoulder measure mark by scale S at No. $11\frac{1}{2}$ which is measure over blade for round of side seam, mark by scale D, $d$, at the No. on it that stands at the intersection of scale Y and scale C, $c$, that is on scale C, $c$, place upper edge of pointer scale R, $r$, at the intersection of scale Z and front edge of A, $a$, and see what No. on scale R, $r$, strikes said intersection and while the pointer is on that position mark by scale S, $s$, at the No. that comes opposite the intersection of scale A, $a$, and Z on scale R, $r$, then move said pointer to the top edge of piece No. 25 and the front edge of scale A, $a$, and mark in like manner by the No. on it that comes to the intersection of scale A, $a$, and piece 25, on scale R, $r$, then move the pointer to the top edge of piece No. 33 and back edge of piece No. 35 and mark in like manner by the No. on scale S, $s$, that comes opposite on scale R, $r$, to the intersection of those pieces, then move the pointer to the top edge of piece No. 33 and to the front edge of piece No. 34 and mark by scale S, $s$, the No. that comes opposite the intersection of said pieces on scale R, $r$, the pieces Nos. 19, 20, 21, 22, 23, 24, 25, 32, 35 and 33 are all laid in half sizes, and the scale on pointer R, $r$, also and the pieces 2, 3, 8, 9, and 10, are also laid half size, and the set of scales that those pieces work to are also half size and the outside ones are full sizes, the R, $r$, scale on pointer is half size and S, $s$, full size, therefore the waist as set in the machine by those half size pieces and scales is half size and the using the pointer as described is to double that size the coat therefore is to be formed by the outside marks obtained by the points which produces a full size waist, remove the instrument and form the fore-part of coat by the various marks so obtained.

*Section 3—To draft the skirt of coat.—* Set piece, 7, so that No. 17 on scale L will come opposite lower edge of bed-plate No. 1, (17 being length of skirt) set piece, 2, so that the No. on scale B will come opposite No. 8 on scale F piece No. 3 of what the size of fore part waist is without the back which will give the size of top of skirt without any fullness, for fullness add according to fashion (the Nos. on scale F being graduated for extra amount of fullness for the extra size waists, for instance say a waist that measures 10 inches, fashion calls for one inch fullness, add on the amount from 8 to 10 for said inch which enables you to give a certain amount of fullness and then to add on by scale F an extra amount for an extra size waist in a regular way, which scale F is laid for, to regulate or grade the size of dress-coat-skirt the scale E is intended to regulate frock and over-coat skirts in the same way commencing at pivot to count for them and using the scale C for the size of thin waists) set piece No. 5 so that the No. on scale H of what the size of waist is (without back as before described) and after it is increased for fullness if it should be, will come opposite mark $o$ on bed-plate No. 1, lower side provided the length of skirt is the same as size of waist, and if not the piece No. 5 is set half the difference between the two which may be done by consulting scale $f$, it being graduated for the different length skirts, and scale H being graduated to the different size waists. By finding the No. on scale H of size waist and on scale $f$ of the length skirt if they differ apart set piece No. 5 so as to be half way between the two, which governs the size of skirt at center by the size of waist and length of skirt and piece No. 6 is set in the same way precisely, scale J indicating the size of waist and scale H the length of skirt which gives a proportionable size skirt to size of waist and length of skirt the point to count from is, $o$, on piece No. 7 lower side of piece 6 (in change of for width of skirt, say for instance wider, than count in front of mark, $o$, the amount, if narrower, vice versa, and the same at piece No. 5. There are several other parts of the machine constructed to work in the same way where fashion is concerned, a description of which will be given in an explanation of regularly setting it for fashions.

*To mark the skirt on the cloth by said instrument for dress coat.—*Place bottom edge of piece No. 6 where the bottom of skirt should come and back edge of bed plate No. 1, where the edge of back pleat is to come and top edge of piece No. 2 is to be placed even with the top of scale A on upper edge of bed-plate No. 1, mark the upper back point of skirt at hip at the notch in bed plate No. 1, top edge back of screw that holds piece No. 2 and mark the shape of back pleat as marked on instrument and for the outside of turn in through the hole in it just below piece No. 5 mark the front end of strap by scale D at the front end of piece No. 2 at the number on said scale of size of waist the upper set of numbers being for the upper edge of strap and the lower ones for the bottom, which gives the width of strap in front according to the size waist a proportionable width, mark at the number on scale G what the size of the waist is of forepart without the back for the length and width of strap and skirt at top, mark at the front end of piece No. 5 for the width at center, mark at the front end of piece No. 6 for the width of skirt at bottom, mark the bottom edge of piece No. 6 for the shape of skirt at bottom, mark at the top edge of piece No. 2 for the shape of the skirt at top, remove the instrument and form the top edge of strap from opposite the mark given by scale G down in front to the mark given by scale D and form the balance of skirt to strike the various other points given by the instrument.

*For frock or overcoat skirt.*—Place the bottom edge of piece No. 6 on the cloth where you want the bottom of skirt to come and the mark on back edge of piece No. 1, bed-plate opposite the pivot in piece No. 3, and ranging with the pleat of dress-coat skirt straight with the back edge of piece No. 1, where the front of skirt is to come with the width of what the lapel is at bottom, back from the edge of cloth, and place piece No. 2 to the angle given by scale that is laid to run up at back end of scale A on bed-plate to the number on it that you intend cutting fullness of skirt (say for instance No. 4 at the top edge of piece No. 2, in which case mark at No. 4, at the scale laid at the lower side of the end of piece No. 2, which scale is graduated to run from No. 2 to No. 12 and the scale at the back end of scale A is also graduated to run from No. 2 to No. 12, which scales are graduated to work together, that is if you lay the top edge of piece No. 2 at No. 4 on back scale mark at No. 4 on front scale for angle of back of skirt, mark the top back point of skirt at hip at the back edge of the projection on upper edge of piece No. 2, it being placed on the number at the scale that you want to cut, the fullness of the skirt by No. 4 making a tolerable full skirt, then fasten pieces 2 and 3 to their places by the screw that passes through piece 3, and groove in bed-plate No. 1, and mark at the number on scale A of the size of waist of forepart without the back for the center and hollow part of skirt at top, which may be seen governs the hollow of shirt waist at top according to the amount of fullness given to skirt at bottom, the waist being cut more hollow at top when an extra amount of fullness is given at bottom, regularly scatters it and produces the right set, the top front edge of skirt will come to where the pivot is in piece No. 3, or to the top edge of bed-plate opposite to the pivot, if the fore part is not pitched down in front more than the instrument section 2, forepart gives it; if it is, take off directly in front and top of skirt as marked on bed-plate No. 1. Remove the instrument and form the hollow of skirt at top from the point given at pivot to the mark given at scale A up to the mark given at the upper edge of piece No. 2 and mark the bottom of skirt equal length with the front to correspond with the hollow of waist and draw a line for back part of skirt by the mark given at projection in piece No. 2 top edge and the one given at the lower scale on the end of piece No. 2 for the angle or spring as marked on end of piece No. 2, which completes the form of the skirt.

*Section 4—to draft the sleeve of coat.*— Set piece No. 2, so the back edge will come opposite No. 26 on scale A, (26 being second shoulder measure). Set piece No. 5 to that 11½ on scale J will come opposite No. 20 on scale G, No. 20 being the measure from center of back to elbow, which sets the length to elbow with width of back of (11½ on scale J being the width of back as given on piece No. 2 back), the numbers on scale J being laid for the different width backs and those on scale G for the length to elbow, whatever the number of width of back is on scale J must be made to match and range with the number of length to elbow on scale G thereby scale J reducing the measure from center of back to elbow the amount the back is wide. Set piece No. 8 so the top edge will come to 11½ on scale O, (which is the length of sleeve measure from elbow down) set piece No. 6 so the back edge will come to No. 6½ on scale K (which is the measure around the elbow) set piece No. 9 so that back edge will come to No. 4½ on scale Q (which is the measure around the hand) and fasten the several pieces so set by their respective screws.

*To mark the sleeve of coat on the cloth by said instrument.*—Place it so the No. 11½ on scales D and C will come where you want the top of sleeve, and the back straight edge of piece No. 1, bed plate will come where you want the back edge of sleeve and mark at the top back corner of piece No. 1, for the top back corner of sleeve head (if the lower shoulder point of fore part is hooked off more than the regular proportion given by instrument No. 2, as described in drafting fore part) to suit a shoulder falling very much off at the immediate lower shoulder point below the track that measure over shoulder point passes over (to every number so marked on scale L of fore part go one number in on the scale laid on the top back corner of pin No. 1, bed-plate of sleeve) (which variation seldom occurs except in extreme cases) mark by scales D and C at 11½ (which is the width of back) on top of upper side sleeve, and at notch in pin No. 2 on the upper side and by scale H at the number on it that is at the back edge of piece No. 2 on scale B for front top edge of upper-side sleeve which are the points to form the sleeve head by (mark by the scale I on piece No. 4 at the same number as marked by on scale H for front top point of underside of sleeve mark by scale E at the number on it of second shoulder measure (which is 26) for the most hollow part of top of underside sleeve and mark through the hole in bed-plate No. 1, to form the top of underside sleeve by which is to be done from the top back corner of bed-plate No. 1, according to the point just given which completes the drafting of upper and lower side sleeve heads, mark at the top edge of piece No. 5 and at the back edge of bed-plate No. 1, for the elbow of sleeve, mark the back edge of piece No. 7, for the back seam of sleeve below elbow and at the offset of said piece at back edge to form the crook of elbow by mark at the same number on scale R, that is on scale Q at the back edge of piece No. 9, mark at the same number on scale L that is on scale K at the back edge of piece No. 6 (for an over coat, mark in the same way by scale M which is marked on piece No. 6, O, V, and the same at scale S which is marked on piece No. 9, O, V, the same), the scales N and T are the proportionable width for the general size, the scales Q and K are graded to produce regular inches when marked to the inside edge of piece No. 6, and to the out edge of piece No. 9, the scale L at piece No. 6 is graded to give the regular amount of increase according to the size given on scale K and the same with scale R which is also graded for the regular decrease of the size given on scale Q marked at the bottom edge of piece No. 9, for the length of sleeve and at the top edge of piece No. 9, for the length of sleeve without the cuff, said piece No. 9 being the width of the part of the cuff that forms the length of the sleeve, also the back end of piece No. 8 draw straight lines by the marks given in front of sleeve and form the sleeve.

*Section 5—To draft lapel of coat.*—Set piece No. 2 so the number on scale A of height of shoulder or that the top edge of piece No. 11 on forepart stands to on scale E will come opposite the top edges of the pieces that hold it on bed-plate No. 1. Set piece No. 7 so the number on scale G that is opposite top edge of piece No. 33, on scale I, i, forepart will come opposite lower end of bed-plate No. 1, of lapel. Place the top end of No. 2 where you want the top of lapel to come and the back edge of bed-plate for the inside edge to come mark the top by scale C (if for a button-up or over coat, by scales D and B) the width in center by scale E (if for over coat by scale F) mark at the bottom by I and J (if for a frock or over coat at scale H) mark by back edge of bed-plate and form the lapel by the marks given (the several widths scales giving proportionable widths to suit the ends of collars and those at the bottom to suit the proportionable width straps), the lengths working from the center up and down corresponds with the center of breast of forepart which work in the same manner.

*Section 6—To draft and mark the collar of coat.*—Place it on the cloth to the place I, J, and D, the scale J is for the bottom edge by scale J at the number on it that comes opposite the top edge of piece No. 11, on scale E of forepart and mark by the same number (which is 12 the height of shoulder) on scale D, E, A, F and I, for shape and size of over coat collars mark at the same number on scale B, C, G, and H and skip 1, J, and D, the scale J is for the bottom front edge of dress coats, and I for the top edge of dress coat and top and front for frock coats, the scale B is for the front and bottom edge of over coat and scale H is for front and top edge of over coat also, the marks made at scale D will be found to meet and match the marks obtained from scale D fore part, the slope marks on scale E are to indicate the amount of fullness the collar has to each neck, which is the amount of the slope of each line mark the crease row of collar by lower edge of scale A and front of collar at crease at the pivot on which No. 3 piece works and form the two kinds of collars, to the marks given for each.

*Section 7—To draft and mark the cuff of coat.*—After placing it where wanted mark front edge and bottom and the width at bottom by scale A at the No. on it that was marked at on scale R of sleeve, the scale B is to match the one on sleeve for over-coats and scale C is to match the proportionable one on sleeve, mark at scale D the same as at scale A and form the cuffs.

Note N. B. The manner of increasing the half sized waist of a coat, to full size may be done by having piece No. 35 (Section 2nd) sufficiently long for full size and another piece similar to 33, double its size to work on piece 35 the same as 33, and a double sized scale on piece 35, to work it by and bring it double the distance down and go double the distance out, and another piece the same as 32, double by which operation you may produce the double sized waist, instead of using the pointer as specified.

Or to more fully explain the principle, and the several modes, by which the application of that principle may be extended to drafting pantaloons and waistcoats: After obtaining their centers in the several parts, to work them out by machines constructed for that purpose.

*A description of the manner of setting Allen's patent drafting machine for coats.*

To suit the change of fashion. For instance to cut a wider back at top set piece No. 12 scale U say half an inch ahead in which case set piece No. 40 scale P, $p$, $\frac{1}{2}$ inch down (on forepart) or the amount of change of No. 12 on back and for a narrower back the reverse motion, and be careful to observe an exact corresponding change in both alike and fasten the respective pieces by the small flat screws that pass through grooves in them to their proper places the like above directions will apply to the following described pieces found in the different parts of the machine as here specified by name. To change the back at the center of shoulder, operate on piece No. 11 scale T (of back) and piece No. 5, scale K (of forepart) those 2 pieces working together. To change the width of back at piece No. 2 say for instance ½ inch wider in which case establish a point to count from ½ inch ahead of bedplate at which point count from when moving No. 2 to draft and not at the end of the groove as specified in the mode of drafting, and for narrower as much back as fashion requires the piece No. 7 on forepart that carries No. 6 is to be governed by it, that is as much as piece No. 7, is set out or in, vary the point of counting from on back, and piece No. 16 to move in like manner with the piece No. 9 scale R. Back piece No. 7 operates with piece No. 17, scale S, forepart, and also piece No. 19 forepart is to vary the point of counting from or by the same as piece No. 2 on back. But as scale U on piece No. 19 forepart is laid to half size vary it only half the distance of the change made on the corresponding scale on back, and the same with piece No. 8 scale Q back, and piece No. 22 scale Y fore part that also being half size, to cut the back scye higher on back, raise piece No. 10 scale S up the amount and piece No. 6 scale L in a corresponding manner, to cut the bottom of back scye lower mark for the bottom of back scye down on piece No. 2 and change piece 15 down a corresponding amount. To cut the back scye wider count the bottom of it down and raise scale S up and push piece No. 15 down and piece No. 6 scale L up the same amount. To cut the breast or neck lower in front or longer collar push piece No. 13 scale P down and in, setting piece No. 12 count down the same amount of change the same as has been before described and the piece No. 2 on collar to be pushed out the same amount piece No. 13 on breast and 2 on collar are fastened with small flat screws as before described. To raise the neck or breast and cut a shorter collar reverse the operation. To give the breast a longer roll set piece No. 3 on piece No. 2 up the distance on small scale on piece No. 2 at back edge of piece No. 13 the amount required, and to whatever No. on small scale you have set No. 3 set piece No. 38 down to on small scale front of bed-plate under side piece fore part; those two scales being graduated to work together and for a shorter roll, the opposite change on each to cut the collar more sloping on the front edge at bottom, (that is longer at the point) change piece No. 3 down on piece No. 2 and count piece No. 12 down the amount and for the opposite effect, the reverse operation. To cut the breast more round in the center change 37 out, and for the opposite effect vice versa. To cut a larger roll move piece 41 out and piece No. 10 on collar the same, and for smaller vice versa, the scales on collar 9, 8 and 7 change out or in to suit the size required to the various parts which they govern, the scales 4, 5 and 6 are for changing the shape in any other way required. Piece No. 4 scale G on skirt is to suit the change of length of strap as required, pieces 3 and 4 on sleeve are for the variation of size of fullness of upper and lower side sleeve, the sleeve to be varied at top to suit the variation of the width of back the scales D, C, B, and F are for the variation of width of lapel at those parts piece No. 2 cuff is for changing the width of it.

*An explanation of the division part of the system as laid in the machine that has not been described in the explanation given of drafting, and an explanation of the connection between the division and measurement parts of the systems.*

The division system throughout the coat is taken from the first shoulder measure and graduated to regular No.'s. For instance the smallest first shoulder measure is 14 and the largest 36 inches and the smallest size No. is 6 which is equal or nearly so to 14 shoulder measure, and the largest size No. is 16 which equal or nearly so to 36 shoulder measure which may be seen by scales D and C on piece No. 2 back. Scale H on back is for proportionable length waist, scale J on piece No. 4 is for proportionable width back at waist scale E. e, on fore part is for do. to waist scale W, (half size) is to work with scale H″ on back (full size) which scales work together the same as scales K′, on back and V (half size) on forepart. Scale J, j, on fore part is for proportionable size waist according to the distance down on piece 35. The proportionable places for the pieces which make angles are marked on the ring or bed plate No. 1, of model and is where the drawings are drawn to the back edge of piece 35 when to its proportionable place which is even with the edge of bed plate No. 1, is where the center of coat is and perpendicular with the person when standing up and one drawn from the pivot front of scye at right angles with the other horizontal with the person, and as much as the lines on the forepart of a coat has sunk below said horizontal line that is measured on the body to go over said horizontal line, is the amount of the convexity which attends the surface of the body, or is the amount of motion a forepart has to apply from a flat surface to the body measured, the figures marked on model (forepart) back of scale P, *p*, is where the back edge of back will lay for full size. The figures marked on the back end of piece No. 18 is the same with back off. When the back lays at those points for the division system and the same with those marked on the back end of piece No. 28, the figures on the lower edge and out end of piece 30 are also for the full size, and those on the lower end of piece 35, are the same, and those on the lower end of piece 36 on back edge scale K, *k*, are the same the small coat No. 4 marked on bed-plate is to show where the different angles starting from the front of the scye strikes all proportionable coats. Scale M on skirt of coat is for proportionable length skirts. Scale F on sleeve is for proportionable lengths to elbow. Scale P is for do. to hand. Those last mentioned scales which were not mentioned in the explanation of drafting are for the purpose of carrying out a regular proportion system to every part of the coat, to enable a person to cut a regular well proportioned coat without taking any measures on the body and being so regulated as to work with and side of the measures when taken and show at every point the amount the person measured is out of regular proportion.

The measure called over blade, is laid corresponding to the measure, height of shoulder, therefore has but one set of numbers, a proportionable person being equal in those two parts. The principle by which the system is laid is to first take the measures and to throw them into divisions for the several parts of the body, and the points being set by those divisions in their separate capacity, produce the whole of the actual measure when the parts are brought together, or at least what they should be, as the coat should not have the exact amount of cloth in all its parts that the body measures, but a regular proportion of that amount: For instance the front half shoulder measure shall have a small proportion more according to its length, and the back-half that same amount less than it measures but the whole shoulder measure what it measures, which will make it so the reason for it is that a coat is worn open in front and the motion of the shoulders is forward, if a person was like a statue and the coat was worn buttoned there would be no necessity of the alteration of the measures. The scales of the present system is calculated to meet the wants and requirements of all those variations, and at the same time constructed in such a manner to make a change of those variations if thought, or found necessary to meet the difference of individuals measuring either tighter or looser than what would be proper to do. The division part of the system being graduated to regular numbers, enables a person to cut the coat by the measures of the parts, that the parts are to go to, or by the division of any other part measure.

To draft a sack coat set the machine the same in every respect as for any other coat, and by the application of scale or set of inches, cut the back as wide at top, center, and bottom as required, and at the same points on fore parts, reduce the same amounts and add on to spring of bottom as much as required and also add to the spring of round-abouts at bottom as much as required to take the foreparts of sack coats out of cloth, place the instrument with front side to the front of cloth sufficient distance up from the bottom for length in front and twist it in such a manner as to give the amount of spring in front required and draft the fore part in that place.

To draft an over coat, increase the measure height of shoulder one inch from that of an under coat and the measure to waist a half an inch, and the over-blade and from front of scye to top of back (which is back half of shoulder measure) the same which should be done, first by adding on to the measure in the table of measures previous to setting the machine, the measure over shoulder point and others connected, will be increased in proportion which will make the first and second shoulder measures one and a half inches larger, the measure for a larger coat than for the size of the person should also be increased in the table of measures previously to setting the machine by them. The scale E on piece 2, back, is for the purpose of cutting the back crooked at top, which scale counts from the back straight-edge of bed-plate piece No. 1, the required amount of inches the back is wide, that is to say, that when there is a deformed person, say a bunch or even on his back, and his shoulder point sloped very much in and down, in which case measure the No. of inches you think he will bear his back wide, which scale E will give according to measure. You can then adjust the back in such a manner as to cut the back-seam round and produce the effect on said back that the description given in drafting before specified.

*An explanation or description of making or constructing machines according to the drawings and explanation of drafting and setting it for fashion, and a summary description of the shape and size of the various pieces of which it is, or may be composed.*

First. The material may be of brass, tin, steel, silver, or other material of sufficient strength to support its various parts according to its construction.

Secondly. The pieces must be of sufficient substance and size to support the various parts attached and of sufficient surface where required for the parts to fit on, and to give sufficient length for the grooves or channels, to support the various sliding pieces on or through them, and the various aims or parts must be sufficient length to admit of the largest size No. to go on them where required, and be so reduced at the parts or edges requiring it, to admit of the use of the smaller size Nos. and the shape as regards angles may be seen by reference to the annexed drawings of the various parts. At the same time all unnecessary material to be avoided, and after those rules of instruction are observed to give to the various parts the most systematic shape consistent with the construction and appearance of the parts or the whole machine; at the same time to give room for the marking by the various parts or Nos. on the parts where required. The construction as regards shape in all its particular and separate parts, being impracticable to describe in a minute manner in writing wherefore a reference for further information in regard to its construction than what is here given must be had to the annexed drawings which are the result of the carrying out the above named principles.

After giving sufficient substance for length, strength &c., as above described, it matters not what the exact shape is further than for appearance, and to preserve the angles, which must be done to an exact nicety, to accord with the construction of the machine (for practical purposes), which said drawing represent and are as patterns by which to be guided with the assistance of the specification of the several parts here given by name of numbers in the following manner.

Of section 1, bed-plate, No. 1, has a plate on the underside for the purpose of forming channels or grooves for pieces No. 2 and 9 to work in, No. 2 passing quite through it and on the top of piece No. 1, there is a small channel for piece No. 6 to work in piece No. 3 slides on the top and straight with the back edge of piece No. 1, and is kept to its plane by a small clasp at the top attached to it and another at the bottom end of and attached to piece No. 1, which one is on the inside of piece No. 3 and the upper one on the outside, and a small part of piece No. 1, fits to the out edge and passes over it through which a screw passes to fasten the several pieces (that have motions) of the whole sectional part. Piece No. 4 works on piece No. 3 as a slide at bottom end, and passes under said piece of No. 1. Piece No. 7 also passing under it and through a groove at the lower end of piece No. 4. Upper end of piece No. 5 also passing through it and lower end works on piece No. 3 the same as No. 4. Piece No. 6 working under piece of No. 1, same as the others mentioned, and on the flat surface of it in said channel up to edge of piece No. 3, and a small clasp at the lower end works over No. 3 to keep them to their places. See draft.

Of section 2, make piece No. 1, (bed plate) according to the prescribed rules mentioned, the ring or circle of which is a circle of 5 to 5⅜ inches struck from the center pivot (for the model) on which the various pieces have their bearing, the center pivot being the point front of scye and from which all the principle angles eminate, there is a large screw passes through at the point.

The various pieces and parts that concentrated to it and are held to their places by and working on it which passes quite through the bed-plate and another plate attaches on underside which forms a case for the circling part of pieces Nos. 18, 28, 29, and 30, to work under that is between it and bed plate, the circle of which pieces are arranged side by side and to each other and the circle of the case to them. Piece No. 18 working first in connection to underside of bed-plate and piece No. 28 next to piece 18 and an arm or projection of it passing over parts of bed-plate and the end of piece 18 and is attached to the screw there being a shoulder from main to circular part which sets said part down even with the edge of piece 18 and the same with pieces 29 and 30, the shoulder being deeper to each as they raise in succession above each other. The end of piece 38 is first attached to the screw which lays on the top flat surface of bed plate. Piece No. 8 is next attached and works over piece 38, and then piece 28 works over that, and then 29, 30, and 42 (pointer) which lays top of the whole. Piece No. 3 works on top and a pivot in back-edge of it works through or in a groove cut through bed-plate of sufficient length to allow the said piece to work to the No. that governs it, said pivot keeping it to its regular angle and passing quite through piece No. 3 and forming a pivot on the top, which passes through a groove cut in piece No. 2 which lays on the top to keep it to its place and screw passing through pieces Nos. 2 and 3 and groove in bed plate which fastens them to any point required, and at the same time piece No. 2 to its required position (see draft).

Piece No. 40 lays on bed-plate and passes alongside of groove in it and under piece No. 3. Piece No. 4 works on the top of bed-plate and is raised up from it sufficient distance to clear the head of screws for fashion and let projections on pieces attached to it in the manner of clasps, which works on one under piece No. 4 attached to it, and is a part of it, which clasps or works in connection with similar pieces on No. 1, which parts or pieces as described form shoulders so that piece No. 4 can work as a slide on bed-plate said screw to fasten it passing through No. 4 and working under raised part of bed-plate as before described in the mode of drafting. Piece No. 5 for fashion lays on piece No. 4 and the lower edge works to or against a projection in piece No. 4 to keep it to its angle. Piece No. 6 lays and works on the flat surface of piece No. 4. Piece No. 7 lays over piece 6, with projections and hollow on underside of it forming a case in such a direction as to keep the angle for the direction of piece No. 6. The three small screws marked on draft pass through piece No. 7 and the middle one through a groove in piece No. 6 and through 3 grooves in piece No. 4 and fastening the whole 3 pieces 4, 6 and 7 together at the point required for fashion, retaining each piece to its proper angle and at the same time enabling to set one without the other, (see that part of draft) No. 11 piece or slide is made a kind of double or triple case for slides or pieces Nos. 12 and 13 to work in or through and at the same time for the whole parts attached to No. 11, to move up and down with it on arm of bed-plate. Scale E piece or slide No. 13 works in piece No. 11 in which piece there is a case formed in a direction to keep the proper angle for No. 13 and a groove cut in the lower end of piece No. 13 for a screw that passes through No. 11, and is for the purpose of fastening it to its place. The screw that fastens No. 11 on bed-plate passes through it and clasps the edge of bed-plate which passes through a case formed in No. 11. There is also a case formed in the out end of piece No. 11 for No. 12 to work in or through. The small part of piece No. 11 that runs up over piece No. 12 is for the scale of fashions, the screw that fastens piece No. 12 passes through No. 11 and clasps No. 12, (see draft). Piece No. 14 works under piece No. 16 and the bottom edge of it butts up against a projection on underside of piece No. 16 and on a range with and a little below the groove in piece No. 16, through which groove a screw passes and through piece 14, which keeps 14 to its place and fastens it at any required point. There is also a small projection on 14 directly ahead of the screw that works in groove to keep 14 solid and firm to its place. Piece No. 15 works in a groove in 14 and is fastened by a small screw that passes through them. The lower end of piece No. 15 works over and top of 16, (see draft of that part). Piece No. 16 lays on the top of 18 and lower edge butts up against a projection on piece 18. To make 16 move on its angle, top edge of piece No. 17, also butts up against edge of projection of 18 to keep it to its angle which lays on 18. Those pieces have grooves cut in them with screws passing through them to fasten them to their required places and the same with other pieces for fashion that work in like manner, (see draft) and for the various parts of a similar nature. The cut end of piece No. 18 has a small clasp on the top for sub-ring to pass under, and 28 and 29 the same and on the underside and end of No. 30 for main-ring to pass under. No. 20, has apartments or cases formed in the top end of it, one on the underside for piece 19 to slide in and one on the top for small slide 21 to work in and so arranged as to let the edges of 19 and 21 come even at the lower side, so that a screw that passes quite through No. 20 will clasp them both and keep them to their places when set. The small loose slide 27 which is merely for the purpose of keeping No. 20 to its place clasps, or goes around No. 28 and piece 20 lays directly over it and is fastened to it by means of a pivot which goes through the upper end of both which allows them to work free and easy in any required way, the end of 19 being fast to No. 18 by a screw as before described in the manner of drafting (see draft of the part) piece or slide No. 23 is fast by a pivot to loose slide 26 which works over and partly around No. 30 precisely in the same way and for the same purpose in all respects as that of 27, and lays directly under No. 23. 23 is a kind of double, or triple case, the first of which is on the top at the back edge for piece No. 10 to work through to keep it to its place. The next is for the lower end of piece No. 20 to work through and another at the bottom side running crossways for piece No. 24 to work through. Piece 24 also has a kind of a case running crossways for the ends or part of 23 to pass through. The small slide 25 works on the lower end of piece 24 (see draft of the parts for further information). Piece 35 is raised from the sliding part of it at its angle with it sufficient distance to pass over the cleats on bed-plate that forms clasps to catch the sliding part of 35 which are so arranged as to keep 35 on its proper angle when moved and fasten to its place by the screw that passes through it and groove in bed-plate as before described in drafting, (see drafts of the parts). The whole sliding part working or laying on bed-plate. Piece 33 has a kind of case over and partly around piece 34 for it to slide through. 35 is set sufficient distance up from its slide to let 33 and 32 work up to the smallest number on it.

Piece 32 is attached to 33 by means of the screw which fastens all three of them to their places as before described in the manner of drafting. Piece 34 is a mere slide. The piece 36 is a slide at the upper part which works on bed-plate has a groove in the outer-lower edge, through which a pivot passes fastened in bed-plate for the purpose of keeping it to its place, and a screw in back (which has been before described in the manner of drafting) to fasten it. Piece 37 lays on the top at upper edge for the purpose of fashion and is fastened the same as other similar pieces described. Piece 38 has a projection at the lower edge on top for the edge of piece 39 to work by and is fastened to its place by the screw that passes through it and groove in bed-plate (see draft for it and all the various other parts described).

Of section 3, piece No. 1. Bed-plate has projections forming-clasps underside for piece No. 7 to work through as a slide, and on the top the same for piece No. 5 and the same on upperside of bottom end of piece No. 7 for No. 6 to work through. Piece No. 3 is a kind of case for piece No. 2 to work in or through which lays on the top surface of bed-plate and is fastened to it by means of a pivot in upperside of back end which passes through both, a small part of front-end piece No. 3 passes round piece No. 2 to keep it to its place, and is fastened by means of a screw passing through piece 3 and groove in bed-plate. Piece No. 4 is the same as other like pieces for fashion (see draft).

Of section 4, piece No. 1. Bed-plate is constructed in accordance with the before described directions with an arm for piece No. 2 to work on which is a slide with a screw on upper edge passing through it which clasps bed-plate to fasten it, the lower edge having a kind of hollow apartment or groove for pieces 3 and 4 to fit in, one laying top of the other and fastened by means of a small screw passing through the top and bottom parts of No. 2 and grooves in pieces 3 and 4. Piece No. 5 at back end has a case formed in a manner to let No. 1 slide through, and in the back corner has a pivot passing through it and the upper end of piece No. 7 underside on which No. 7 works for the change of angle of elbow which piece No. 7 is fastened to its angle by a screw passing through No. 5 and groove in No. 7. Piece No. 5 is fastened to No. 1 by a screw passing through it to catch the edge of No. 1 (see draft). Piece No. 6 is a slide working on No. 5 with a screw at bottom edge to fasten it like No. 2. Piece No. 8 has a case in the end which forms a slide for piece No. 7 to pass through and is fastened by a screw the same as No. 5. Piece 9 works on No. 8 the same as No. 6 with the screw at the top to fasten it (see draft).

Of section 5. Bed-plate No. 1 has projections on the top forming clasps to let No. 2 work in as a slide, and on the bottom the same for No. 7 to work in. Pieces 5 and 6 are for fashion as before described and the same with Nos. 3 and 4 on piece No. 2 (see draft) of section 6. Piece No. 2 works on bed-plate in grooves or catches and is fastened by a small screw passing through it and groove in bed-plate. Piece No. 3 is fastened to piece No. 2 by a pivot passing through them at lower end. Piece No. 3 laying top and to No. 2 by a screw passing through it and groove in No. 2 a groove being cut in bed-plate to make room for the head to work (see draft). The pieces 10, 9, 8, 7, 6, 5 and 4 are all to work for fashion as described in the explanation of setting the machine for fashion of section 7. Piece No. 2 works on bed-plate as a slide (see draft). Note N. B. The present drawings are laid half size to the machine, considered the most convenient size for use. And all the sliding pieces in the machine that has not got screws to fasten them, which holds by friction, may have screws or other fastenings to hold them to their places, the same as those that have.

What I claim as my invention, and desire to secure by Letters Patent is—

The use of the slides for laying off the division of the several measures for a coat in combination with the fashion slides for the purpose and in the manner herein set forth.

WILLIAM W. ALLEN.

Witnesses:
JOHN F. R. COMBS,
EDWARD ROBBINS.